(12) United States Patent
Magro et al.

(10) Patent No.: US 11,099,786 B2
(45) Date of Patent: Aug. 24, 2021

(54) SIGNALING FOR HETEROGENEOUS MEMORY SYSTEMS

(71) Applicant: Advanced Micro Devices, Inc., Santa Clara, CA (US)

(72) Inventors: James R. Magro, Austin, TX (US); Kedarnath Balakrishnan, Bangalore (IN)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 16/730,070

(22) Filed: Dec. 30, 2019

(65) Prior Publication Data

US 2021/0200467 A1 Jul. 1, 2021

(51) Int. Cl.
*G06F 3/06* (2006.01)

(52) U.S. Cl.
CPC .......... *G06F 3/0659* (2013.01); *G06F 3/0611* (2013.01); *G06F 3/0679* (2013.01)

(58) Field of Classification Search
CPC ...... G06F 3/061; G06F 3/0659; G06F 3/0679; G06F 11/20; G06F 13/1642; G06F 13/1668; G06F 13/1673; G06F 13/24; G06F 13/4221; G06F 13/4234; G06F 13/4282; G06F 2213/0026; G06F 3/0604; G06F 3/0652; G06F 3/0671; G11C 2207/104; G11C 7/1006; G11C 7/1072; H04L 47/26; H04L 47/30

(Continued)

(56) References Cited

U.S. PATENT DOCUMENTS 10,572,180 B1 * 2/2020 Nemawarkar ........ G06F 3/0652
2003/0177320 A1 9/2003 Sah et al.
(Continued)

FOREIGN PATENT DOCUMENTS

KR 10-2015-0017526 A 2/2015

OTHER PUBLICATIONS

International Search Report and Written Opinion for International Application No. PCT/US2020/064265, dated Apr. 5, 2021, 7 pages.

*Primary Examiner* — Thong Q Le
(74) *Attorney, Agent, or Firm* — Polansky & Associates, P.L.L.C.; Paul J. Polansky; Nathan H. Calvert

(57) ABSTRACT

A memory controller interfaces with a non-volatile storage class memory (SCM) module over a heterogeneous memory channel, and includes a command queue for receiving memory access commands. A memory interface queue is coupled to the command queue for holding outgoing commands. A non-volatile command queue is coupled to the command queue for storing non-volatile read commands that are placed in the memory interface queue. An arbiter selects entries from the command queue, and places them in the memory interface queue for transmission over a heterogeneous memory channel. A control circuit is coupled to the heterogeneous memory channel for receiving a ready response from the non-volatile SCM module indicating that responsive data is available for a non-volatile read command, and in response to receiving the ready response, causing a send command to be placed in the memory interface queue for commanding the non-volatile SCM module to send the responsive data.

18 Claims, 6 Drawing Sheets

(58) Field of Classification Search
USPC .......................................................... 71/105
See application file for complete search history.

(56) References Cited

U.S. PATENT DOCUMENTS

| | | |
|---|---|---|
| 2011/0238934 A1 | 9/2011 | Xu et al. |
| 2013/0212318 A1 | 8/2013 | Toelkes et al. |
| 2015/0046642 A1 | 2/2015 | Lee et al. |
| 2017/0068476 A1 | 3/2017 | Hayes et al. |

* cited by examiner

SIGNALING FOR HETEROGENEOUS MEMORY SYSTEMS

BACKGROUND

Computer systems typically use inexpensive and high-density dynamic random access memory (DRAM) chips for main memory. Most DRAM chips sold today are compatible with various double data rate (DDR) DRAM standards promulgated by the Joint Electron Devices Engineering Council (JEDEC). DDR memory controllers are used to manage the interface between various memory accessing agents and DDR DRAMs according to published DDR standards.

A non-volatile dual-inline memory module with persistent storage ("NVDIMM-P") is a storage class memory that can be used in place of standard DDR DIMMs but include persistent memory. However, these memories have non-deterministic access latencies and may have on-board media management activities that may temporarily delay the access to the non-volatile memory, and thus these memories require a handshake protocol to inform the host controller about the availability of data from the NVDIMM-P. JEDEC is developing a transactional protocol to mitigate the performance impact of this non-determinism, to provide capabilities to enable out-of-order transactions and to stack commands.

Figure 1:
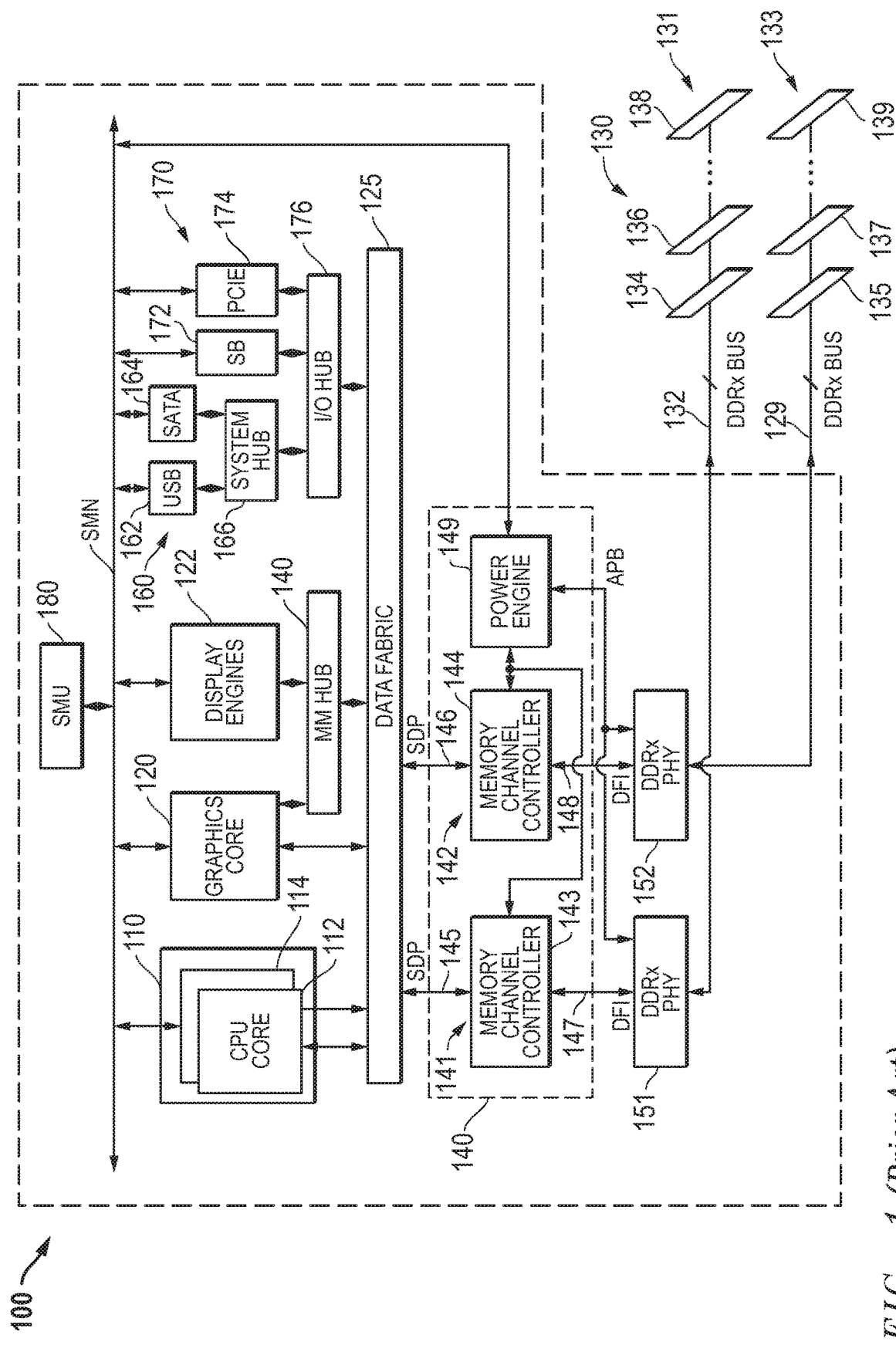
FIG. 1 illustrates in block diagram form an accelerated processing unit (APU) and memory system known in the prior art.

In the following description, the use of the same reference numerals in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION OF ILLUSTRATIVE EMBODIMENTS

A memory controller interfaces with at least one non-volatile storage class memory (SCM) module. The memory controller includes a command queue, a memory interface queue, a non-volatile command queue (NV queue), an arbiter, and a control circuit. The command queue has a first input for receiving memory access commands including volatile memory reads, volatile memory writes, non-volatile memory reads, and non-volatile memory writes, and an output, and has a plurality of entries. The memory interface queue has an input coupled to the output of the command queue, and an output for coupling to a heterogeneous memory channel coupled to at the least one non-volatile SCM module. The NV queue is coupled to the output of the command queue for storing non-volatile read commands that are placed in the memory interface queue. The arbiter is coupled to the command queue for selecting entries from the command queue, and placing them in the memory interface queue causing them to be transmitted over the heterogeneous memory channel. The control circuit is adapted to be coupled to the heterogeneous memory channel for receiving a ready response from the non-volatile SCM module indicating that responsive data is available for an associated one of the non-volatile read commands, and in response causing a send command to be placed in the memory interface queue for commanding the non-volatile SCM module to send the responsive data.

A method includes receiving a plurality of memory access requests including volatile memory reads, volatile memory writes, non-volatile memory reads, and non-volatile memory writes. Memory access commands for fulfilling the memory access requests are placed in a memory interface queue and transmitting the memory access commands from the memory interface queue to a heterogeneous memory channel connected to a non-volatile storage class memory (SCM) module. The method includes storing the non-volatile read commands that are placed in the memory interface queue in a NV queue. A ready response is received from the non-volatile SCM module indicating that responsive data is available for an associated one of the non-volatile read commands. In response, the method includes placing a send command for commanding the non-volatile SCM module to send the responsive data in the memory interface queue.

A data processing system includes a central processing unit, a data fabric coupled to the central processing unit, and a memory controller coupled to the data fabric for fulfilling memory requests from the central processing unit. The memory controller includes a command queue, a memory interface queue, a NV queue, an arbiter, and a control circuit. The command queue has a first input for receiving memory access commands including volatile memory reads, volatile memory writes, non-volatile memory reads, and non-volatile memory writes, and an output, and has a plurality of entries. The memory interface queue has an input coupled to the output of the command queue, and an output for coupling to a heterogeneous memory channel coupled to at the least one non-volatile SCM module. The NV queue is coupled to the output of the command queue for storing non-volatile read commands that are placed in the memory interface queue. The arbiter is coupled to the command queue for selecting entries from the command queue and placing them in the memory interface queue, causing them to be transmitted over the heterogeneous memory channel. The control circuit is coupled to the heterogeneous memory channel for receiving a ready response from the non-volatile SCM module indicating that responsive data is available for an associated one of the non-volatile read commands, and in response to receiving the ready response, causes a send command to be placed in the memory interface queue for commanding the non-volatile SCM module to send the responsive data.

FIG. 1 illustrates in block diagram form an accelerated processing unit (APU) 100 and memory system 130 known in the prior art. APU 100 is an integrated circuit suitable for use as a processor in a host data processing system, and includes generally a central processing unit (CPU) core complex 110, a graphics core 120, a set of display engines 122, a memory management hub 140, a data fabric 125, a set of peripheral controllers 160, a set of peripheral bus controllers 170, and a system management unit (SMU) 180.

CPU core complex 110 includes a CPU core 112 and a CPU core 114. In this example, CPU core complex 110 includes two CPU cores, but in other embodiments CPU core complex 110 can include an arbitrary number of CPU cores. Each of CPU cores 112 and 114 is bidirectionally connected to a system management network (SMN), which forms a control fabric, and to data fabric 125, and is capable of providing memory access requests to data fabric 125. Each of CPU cores 112 and 114 may be unitary cores, or may further be a core complex with two or more unitary cores sharing certain resources such as caches.

Graphics core 120 is a high performance graphics processing unit (GPU) capable of performing graphics operations such as vertex processing, fragment processing, shading, texture blending, and the like in a highly integrated and parallel fashion. Graphics core 120 is bidirectionally connected to the SMN and to data fabric 125, and is capable of providing memory access requests to data fabric 125. In this regard, APU 100 may either support a unified memory architecture in which CPU core complex 110 and graphics core 120 share the same memory space, or a memory architecture in which CPU core complex 110 and graphics core 120 share a portion of the memory space, while graphics core 120 also uses a private graphics memory not accessible by CPU core complex 110.

Display engines 122 render and rasterize objects generated by graphics core 120 for display on a monitor. Graphics core 120 and display engines 122 are bidirectionally connected to a common memory management hub 140 for uniform translation into appropriate addresses in memory system 130, and memory management hub 140 is bidirectionally connected to data fabric 125 for generating such memory accesses and receiving read data returned from the memory system.

Data fabric 125 includes a crossbar switch for routing memory access requests and memory responses between any memory accessing agent and memory management hub 140. It also includes a system memory map, defined by basic input/output system (BIOS), for determining destinations of memory accesses based on the system configuration, as well as buffers for each virtual connection.

Peripheral controllers 160 include a universal serial bus (USB) controller 162 and a Serial Advanced Technology Attachment (SATA) interface controller 164, each of which is bidirectionally connected to a system hub 166 and to the SMN bus. These two controllers are merely exemplary of peripheral controllers that may be used in APU 100.

Peripheral bus controllers 170 include a system controller or "Southbridge" (SB) 172 and a Peripheral Component Interconnect Express (PCIe) controller 174, each of which is bidirectionally connected to an input/output (I/O) hub 176 and to the SMN bus. I/O hub 176 is also bidirectionally connected to system hub 166 and to data fabric 125. Thus for example a CPU core can program registers in USB controller 162, SATA interface controller 164, SB 172, or PCIe controller 174 through accesses that data fabric 125 routes through I/O hub 176. Software and firmware for APU 100 are stored in a system data drive or system BIOS memory (not shown) which can be any of a variety of non-volatile memory types, such as read-only memory (ROM), flash electrically erasable programmable ROM (EEPROM), and the like. Typically, the BIOS memory is accessed through the PCIe bus, and the system data drive through the SATA interface.

SMU 180 is a local controller that controls the operation of the resources on APU 100 and synchronizes communication among them. SMU 180 manages power-up sequencing of the various processors on APU 100 and controls multiple off-chip devices via reset, enable and other signals. SMU 180 includes one or more clock sources (not shown), such as a phase locked loop (PLL), to provide clock signals for each of the components of APU 100. SMU 180 also manages power for the various processors and other functional blocks, and may receive measured power consumption values from CPU cores 112 and 114 and graphics core 120 to determine appropriate power states.

Memory management hub 140 and its associated physical interfaces (PHYs) 151 and 152 are integrated with APU 100 in this embodiment. Memory management hub 140 includes memory channels 141 and 142 and a power engine 149. Memory channel 141 includes a host interface 145, a memory channel controller 143, and a physical interface 147. Host interface 145 bidirectionally connects memory channel controller 143 to data fabric 125 over a serial presence detect link (SDP). Physical interface 147 bidirectionally connects memory channel controller 143 to PHY 151, and conforms to the DDR PHY Interface (DFI) Specification. Memory channel 142 includes a host interface 146, a memory channel controller 144, and a physical interface 148. Host interface 146 bidirectionally connects memory channel controller 144 to data fabric 125 over another SDP. Physical interface 148 bidirectionally connects memory channel controller 144 to PHY 152, and conforms to the DFI Specification. Power engine 149 is bidirectionally connected to SMU 180 over the SMN bus, to PHYs 151 and 152 over the APB, and is also bidirectionally connected to memory channel controllers 143 and 144. PHY 151 has a bidirectional connection to memory channel 131. PHY 152 has a bidirectional connection memory channel 133.

Memory management hub 140 is an instantiation of a memory controller having two memory channel controllers and uses a shared power engine 149 to control operation of both memory channel controller 143 and memory channel controller 144 in a manner that will be described further below. Each of memory channels 141 and 142 can connect to state-of-the-art DDR memories such as DDR version four (DDR4), low power DDR4 (LPDDR4), graphics DDR version five (gDDR5), and high bandwidth memory (HBM), and can be adapted for future memory technologies. These memories provide high bus bandwidth and high speed operation. At the same time, they also provide low power modes to save power for battery-powered applications such as laptop computers, and also provide built-in thermal monitoring.

Memory system 130 includes a memory channel 131 and a memory channel 133. Memory channel 131 includes a set of dual inline memory modules (DIMMs) connected to a DDRx bus 132, including representative DIMMs 134, 136, and 138 that in this example correspond to separate ranks. Likewise, memory channel 133 includes a set of DIMMs connected to a DDRx bus 129, including representative DIMMs 135, 137, and 139.

APU 100 operates as the central processing unit (CPU) of a host data processing system and provides various buses and interfaces useful in modern computer systems. These interfaces include two double data rate (DDRx) memory channels, a PCIe root complex for connection to a PCIe link, a USB controller for connection to a USB network, and an interface to a SATA mass storage device.

APU 100 also implements various system monitoring and power saving functions. In particular one system monitoring function is thermal monitoring. For example, if APU 100 becomes hot, then SMU 180 can reduce the frequency and voltage of CPU cores 112 and 114 and/or graphics core 120. If APU 100 becomes too hot, then it can be shut down entirely. Thermal events can also be received from external sensors by SMU 180 via the SMN bus, and SMU 180 can reduce the clock frequency and/or power supply voltage in response.

Figure 2:
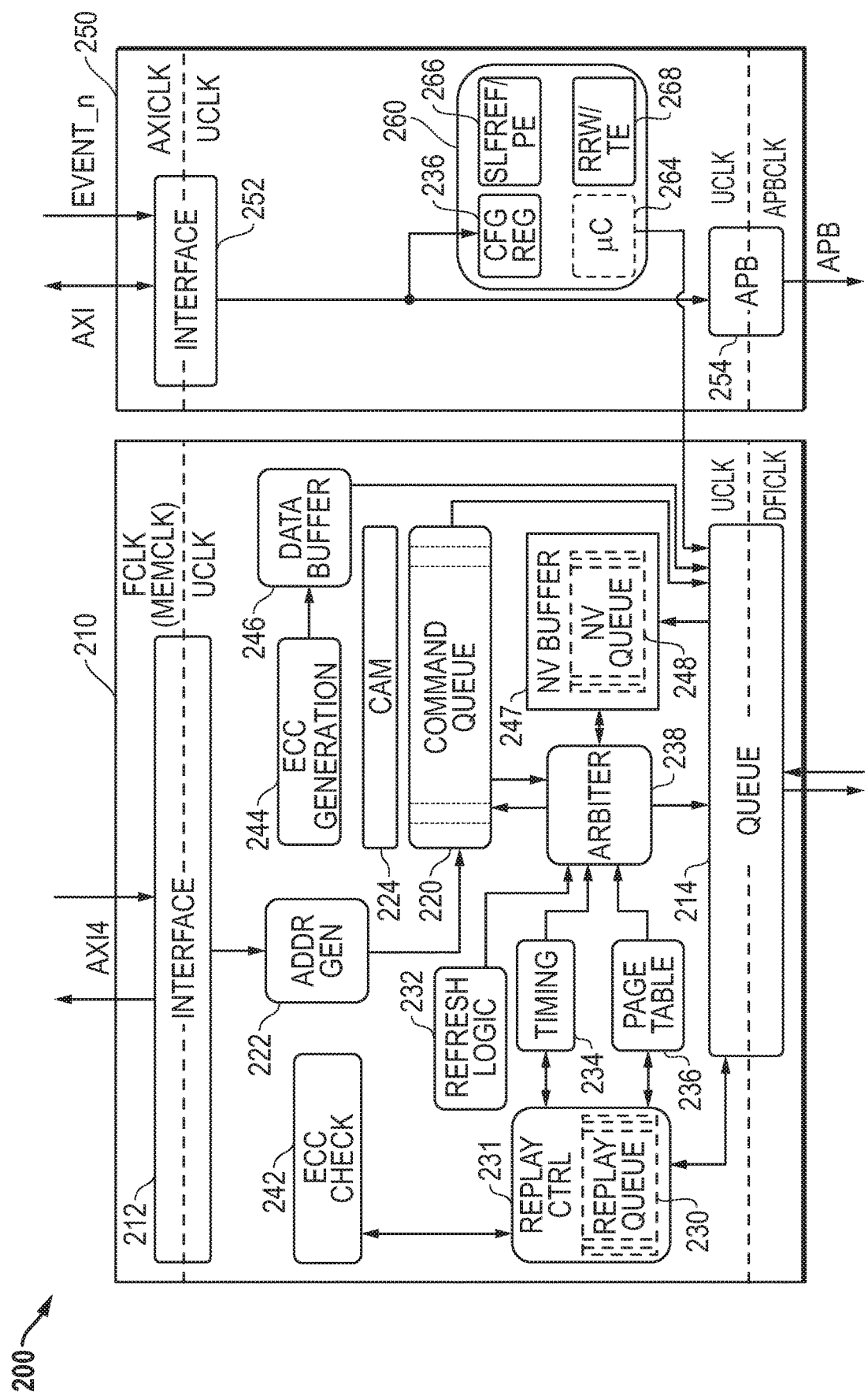
FIG. 2 illustrates in block diagram form a memory controller suitable for use in an APU like that of FIG. 1 according to some embodiments.

FIG. 2 illustrates in block diagram form a memory controller 200 that is suitable for use in an APU like that of FIG. 1. Memory controller 200 includes generally a memory channel controller 210 and a power controller 250. Memory channel controller 210 includes generally an interface 212, a memory interface queue 214, a command queue 220, an address generator 222, a content addressable memory (CAM) 224, replay control logic 231 including a replay queue 230, a refresh logic block 232, a timing block 234, a page table 236, an arbiter 238, an error correction code (ECC) check circuit 242, an ECC generation block 244, a data buffer 246, a non-volatile (NV) buffer 247, and a NV queue 248.

Interface 212 has a first bidirectional connection to data fabric 125 over an external bus, and has an output. In memory controller 200, this external bus is compatible with the advanced extensible interface version four specified by ARM Holdings, PLC of Cambridge, England, known as "AXI4", but can be other types of interfaces in other embodiments. Interface 212 translates memory access requests from a first clock domain known as the FCLK (or MEMCLK) domain to a second clock domain internal to memory controller 200 known as the UCLK domain. Similarly, memory interface queue 214 provides memory accesses from the UCLK domain to a DFICLK domain associated with the DFI interface.

Address generator 222 decodes addresses of memory access requests received from data fabric 125 over the AXI4 bus. The memory access requests include access addresses in the physical address space represented in a normalized format. Address generator 222 converts the normalized addresses into a format that can be used to address the actual memory devices in memory system 130, as well as to efficiently schedule related accesses. This format includes a region identifier that associates the memory access request with a particular rank, a row address, a column address, a bank address, and a bank group. On startup, the system BIOS queries the memory devices in memory system 130 to determine their size and configuration, and programs a set of configuration registers associated with address generator 222. Address generator 222 uses the configuration stored in the configuration registers to translate the normalized addresses into the appropriate format. Address generator 222 decodes the address range of the memory, including NVDIMM-P memory, and stores a decoded signal indicating whether the memory access request is a request to NVDIMM-P in command queue 220. Arbiter 238 can then prioritize the NVDIMM-P requests with appropriate priority relative to other requests. Command queue 220 is a queue of memory access requests received from the memory accessing agents in APU 100, such as CPU cores 112 and 114 and graphics core 120. Command queue 220 stores the address fields decoded by address generator 222 as well other address information that allows arbiter 238 to select memory accesses efficiently, including access type and quality of service (QoS) identifiers. CAM 224 includes information to enforce ordering rules, such as write after write (WAW) and read after write (RAW) ordering rules.

Error correction code (ECC) generation block 244 determines the ECC of write data to be sent to the NVDIMM-P. ECC check circuit 242 checks the received ECC against the incoming ECC.

Replay queue 230 is a temporary queue for storing selected memory accesses picked by arbiter 238 that are awaiting responses, such as address and command parity responses. Replay control logic 231 accesses ECC check circuit 242 to determine whether the returned ECC is correct or indicates an error. Replay control logic 231 initiates and controls a replay sequence in which accesses are replayed in the case of a parity or ECC error of one of these cycles. Replayed commands are placed in the memory interface queue 214.

Refresh logic 232 includes state machines for various powerdown, refresh, and termination resistance (ZQ) calibration cycles that are generated separately from normal read and write memory access requests received from memory accessing agents. For example, if a memory rank is in precharge powerdown, it must be periodically awakened to run refresh cycles. Refresh logic 232 generates refresh commands periodically to prevent data errors caused by leaking of charge off storage capacitors of memory cells in DRAM chips. In addition, refresh logic 232 periodically calibrates ZQ to prevent mismatch in on-die termination resistance due to thermal changes in the system.

Arbiter 238 is bidirectionally connected to command queue 220 and is the heart of memory channel controller 210. It improves efficiency by intelligent scheduling of accesses to improve the usage of the memory bus. Arbiter 238 uses timing block 234 to enforce proper timing relationships by determining whether certain accesses in command queue 220 are eligible for issuance based on DRAM timing parameters. For example, each DRAM has a minimum specified time between activate commands, known as "$t_{RC}$". Timing block 234 maintains a set of counters that determine eligibility based on this and other timing parameters specified in the JEDEC specification, and is bidirectionally connected to replay queue 230. Page table 236 maintains state information about active pages in each bank and rank of the memory channel for arbiter 238, and is bidirectionally connected to replay queue 230.

NV buffer 247 stores NV read commands in NV queue 248, both for use in replay sequences, and for managing NV read responses. NV buffer 247 is bidirectionally connected to memory interface queue 214 for handling RD_RDY and SEND commands, as further described below.

In response to write memory access requests received from interface 212, ECC generation block 244 computes an ECC according to the write data. Data buffer 246 stores the write data and ECC for received memory access requests. It outputs the combined write data/ECC to memory interface queue 214 when arbiter 238 picks the corresponding write access for dispatch to the memory channel.

Power controller 250 generally includes an interface 252 to an advanced extensible interface, version one (AXI), an advanced peripherabl bus (APB) interface 254, and a power engine 260. Interface 252 has a first bidirectional connection to the SMN, which includes an input for receiving an event signal labeled "EVENT_n" shown separately in FIG. 2, and an output. APB interface 254 has an input connected to the output of interface 252, and an output for connection to a PHY over an APB. Power engine 260 has an input connected to the output of interface 252, and an output connected to an input of memory interface queue 214. Power engine 260 includes a set of configuration registers 262, a microcontroller (µC) 264, a self refresh controller (SLFREF/PE) 266, and a reliable read/write timing engine (RRW/TE) 268. Configuration registers 262 are programmed over the AXI bus, and store configuration information to control the operation of various blocks in memory controller 200. Accordingly, configuration registers 262 have outputs connected to these blocks that are not shown in detail in FIG. 2. Self refresh controller 266 is an engine that allows the manual generation of refreshes in addition to the automatic generation of refreshes by refresh logic 232. Reliable read/write timing engine 268 provides a continuous memory access stream to memory or I/O devices for such purposes as DDR interface maximum read latency (MRL) training and loopback testing.

Memory channel controller 210 includes circuitry that allows it to pick memory accesses for dispatch to the associated memory channel. In order to make the desired arbitration decisions, address generator 222 decodes the address information into predecoded information including rank, row address, column address, bank address, and bank group in the memory system, and command queue 220 stores the predecoded information. Configuration registers 262 store configuration information to determine how address generator 222 decodes the received address information. Arbiter 238 uses the decoded address information, timing eligibility information indicated by timing block 234, and active page information indicated by page table 236 to efficiently schedule memory accesses while observing other criteria such as quality of service (QoS) requirements. For example, arbiter 238 implements a preference for accesses to open pages to avoid the overhead of precharge and activation commands required to change memory pages, and hides overhead accesses to one bank by interleaving them with read and write accesses to another bank. In particular during normal operation, arbiter 238 normally keeps pages open in different banks until they are required to be precharged prior to selecting a different page.

Figure 3:
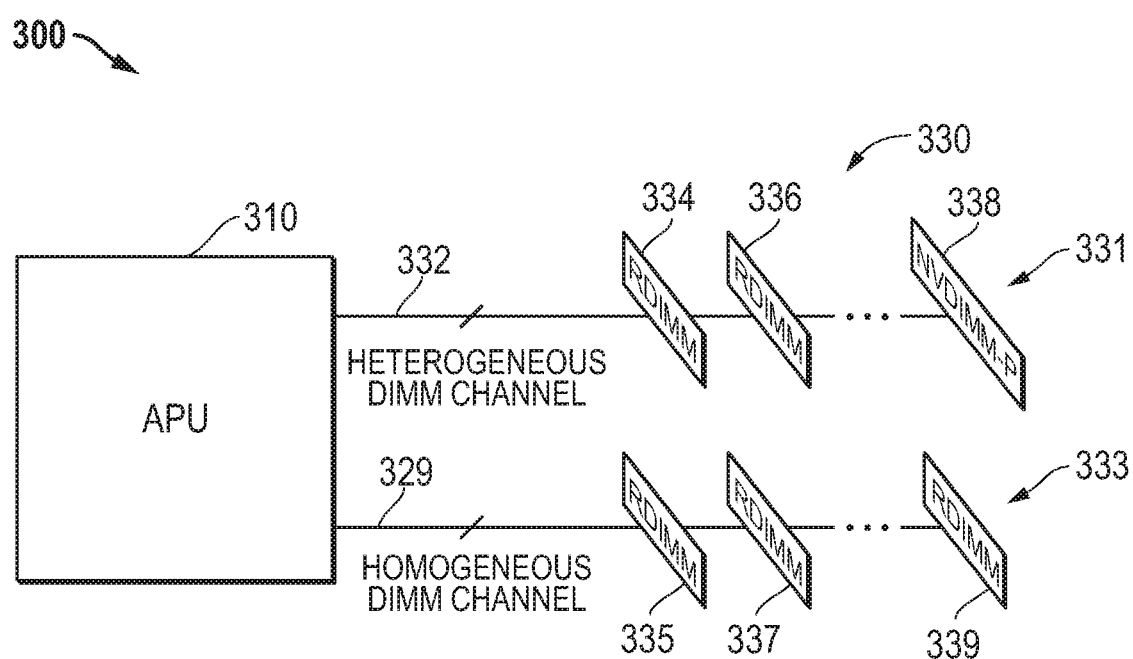
FIG. 3 illustrates in block diagram form a pair of memory channels and an APU according to some embodiments.

FIG. 3 illustrates in block diagram form a data processing system 300 according to some embodiments. Data processing system 300 includes a memory system 330 and an APU 310. APU 310 includes memory controllers like memory controller 200 (FIG. 2) supporting heterogeneous memory channels to interface with memory system 330. In addition to normal DDRx memory channels, APU 310 supports NVDIMM-P 338 on a heterogeneous memory channel 330 having both normal registered DIMMs or RDIMMs 334 and 336 and NVDIMM-P 338, in addition to a homogeneous memory channel 340 having only RDIMMs 344, 346, and 348 connected over bus 342. While in this embodiment heterogeneous memory channel 330 connects to both NVDIMM-Ps and RDIMMs, the heterogeneous memory channel has the ability to interface with all NVDIMM-P type DIMMs in some embodiments.

According to the draft NVDIMM-P standard, transactions between the memory controller on APU 310 and NVDIMM-P 338 are protected by "Link" ECC. Link ECC ensures data integrity for the data transfer between the memory controller and the NVDIMM over bus 332. In accordance with known ECC mechanisms, it protects against data corruption on the link caused by a random or transient error. The protection varies according to the ECC code used. The ECC may allow, for example, single-bit correction with multiple-bit error detection. In response to detecting an uncorrectable error, the memory controller can replay the transaction so that a transient or random error will not persist, and can also report both correctable and uncorrectable errors to the operating system.

While NVDIMM-P type DIMMs are described in this embodiment, other embodiments employ the techniques herein to interface with other types of storage class memory (SCM) modules over a heterogeneous memory channel. As used herein, SCM indicates a memory module with non-volatile memory that is addressable in the system memory space. The non-volatile memory in an SCM module can be buffered with RAM and/or paired with RAM on board the SCM module. The SCM memory address map appears alongside conventional DRAM population from the operating system (OS) perspective. The OS is typically aware that the SCM defined address range is a "different" type of memory than conventional memory. This distinction is to inform the OS that this memory may be more latent and has a persistent quality. The OS can map the SCM memory as Direct Access memory or Filesystem Access memory. Direct Access implies the OS accessing the SCM address range as physical addressable memory. File system access implies the OS manages the persistent memory as part of the file system and manages access to the SCM via file-based API. Ultimately the request comes to the memory controller within the SCM address range independent of how the OS at a higher level manages the access.

Figures 4, 5:
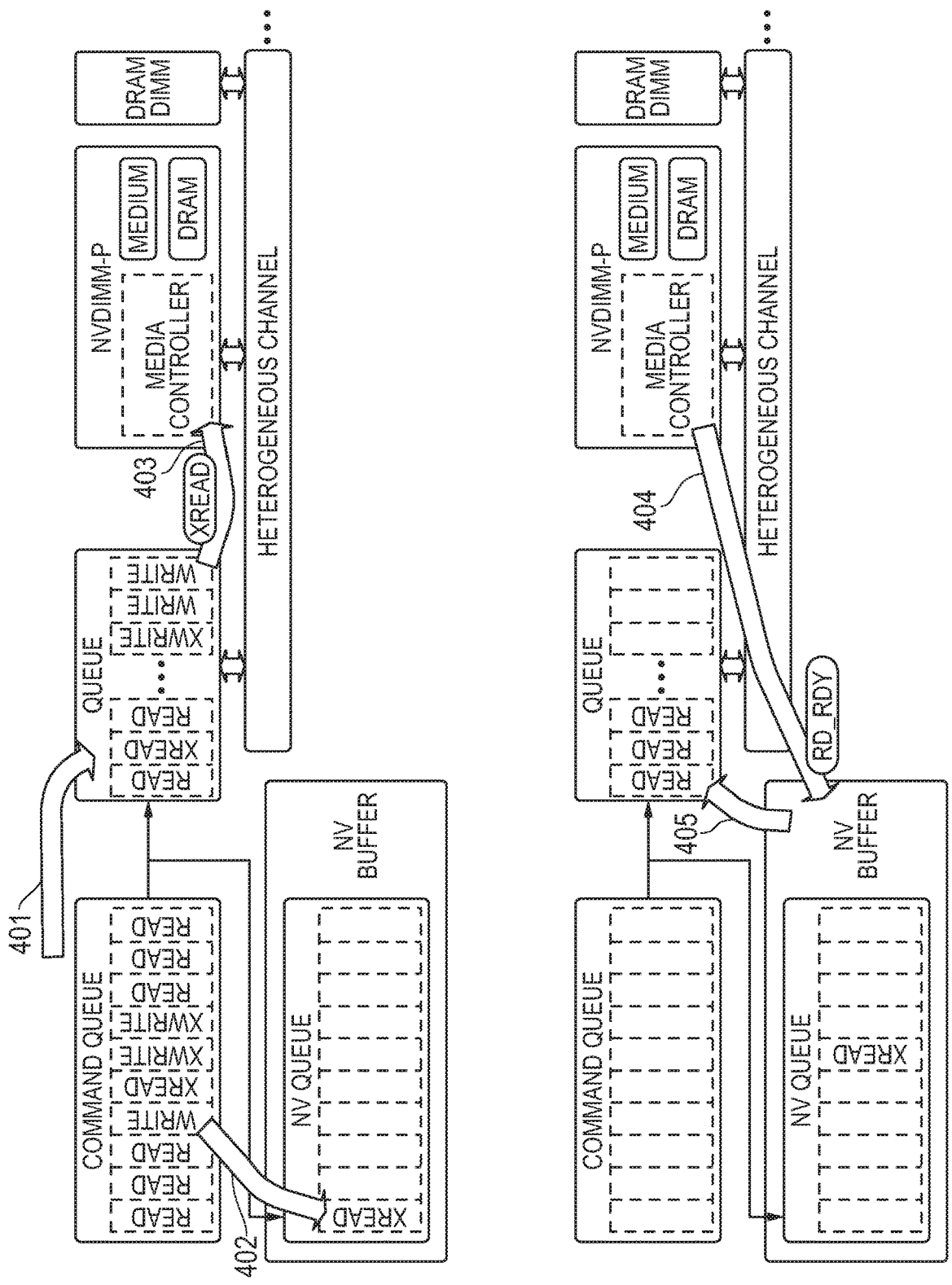
FIG. 4 illustrates in diagram form a process of handling memory access commands according to some embodiments.
FIG. 5 illustrates in diagram form further portions of the process of FIG. 4.
Figure 6:
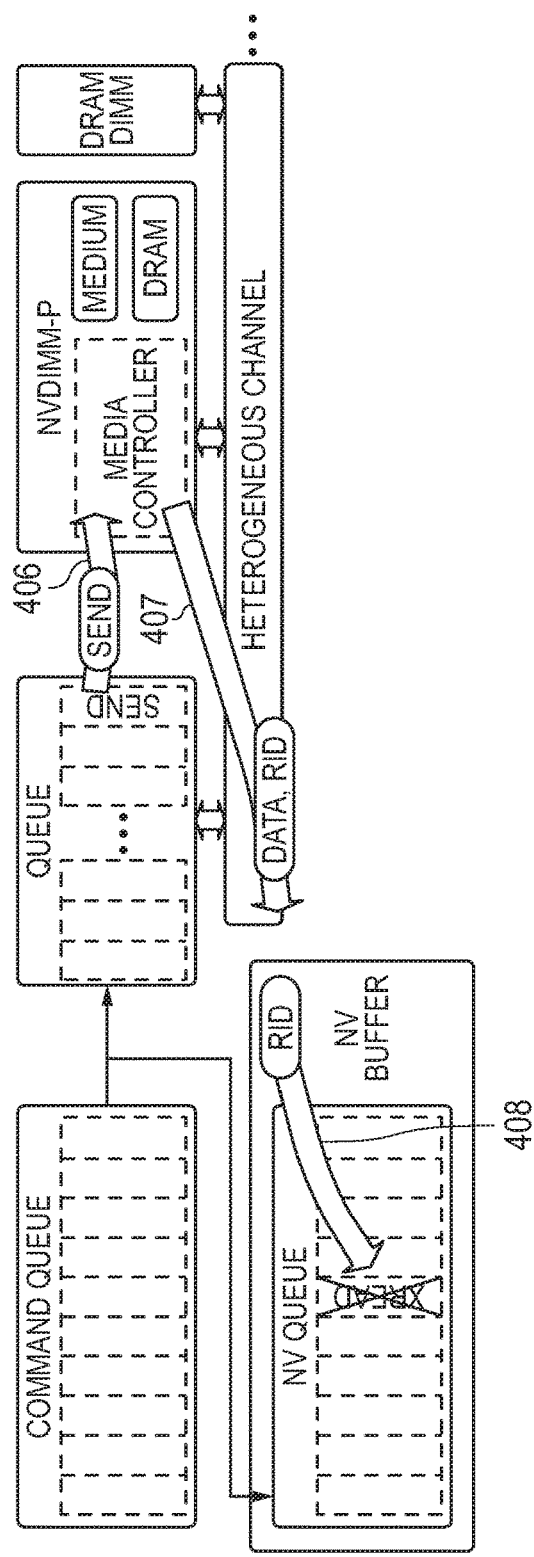
FIG. 6 illustrates in diagram form still further portions of the process of FIGS. 4 and 5.

FIGS. 4-6 are a series of diagrams illustrating a process 700 (FIG. 7) of handling non-volatile read commands according to some embodiments. The depicted process includes the use of NV queue 248 to hold NV read commands, such as XREAD commands, to complete fulfillment of the commands and to make the commands available for a replay process should an error occur requiring replay of commands. FIGS. 4-6 will be described with reference to FIG. 7.

Figure 7:
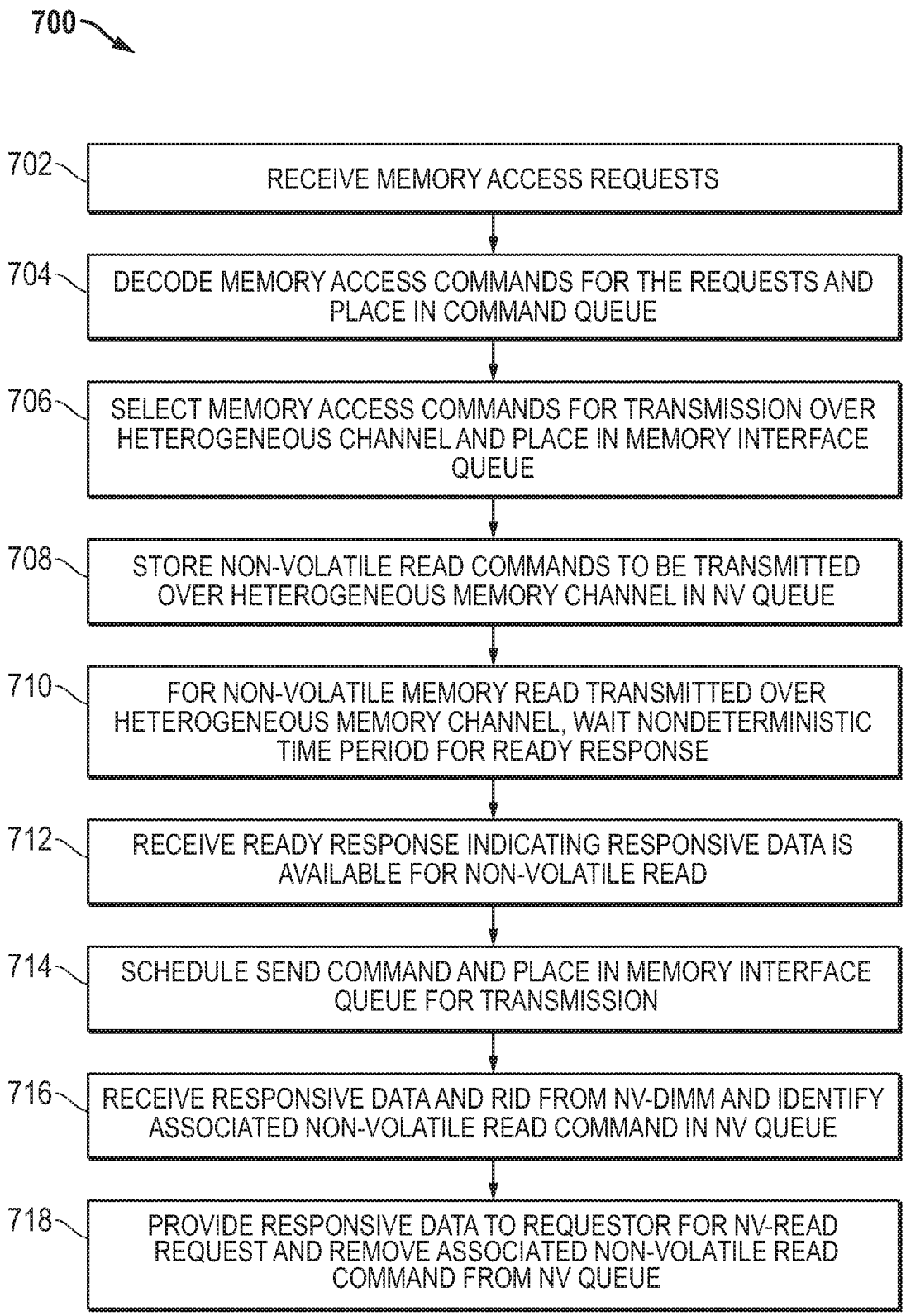
FIG. 7 is a flow diagram of a process for handing memory access requests according to some embodiments.

FIG. 7 is a flow diagram of process 700 for handing memory access commands according to some embodiments. Process 700 is suitable for implementation with memory controller 200 of FIG. 2, or other memory controller arrangements. Process 700 begins at block 702, where the process receives a plurality of memory access requests including volatile memory reads, volatile memory writes, non-volatile memory reads, and non-volatile memory writes. Memory access commands for fulling the requests are decoded at block 704 and placed in a command queue such as command queue 220 (FIG. 2).

At block 706, memory access commands from the command queue are selected for transmission over a heterogeneous memory channel. The selection is typically performed by an arbiter such as arbiter 238 (FIG. 2). The selected memory access commands are placed in a memory interface queue to be transmitted. An example of this is shown in the diagram of FIG. 4, with arrow 401 depicting commands being placed into the memory interface queue. At block 708, process 700 stores the non-volatile read commands that are placed in the memory interface queue in a non-volatile command queue (NV queue) such as NV queue 248 (FIG. 2). An example of this is shown at arrow 402 where an XREAD command that was sent to the memory interface queue is stored in the NV queue. Memory access commands from the memory interface queue are transmitted over to a heterogeneous memory channel coupled to a volatile dual in-line memory module (DIMM) and a non-volatile DIMM. The transmission of memory access commands from the memory interface queue is depicted by arrow 403 showing an XREAD command passing over the heterogeneous memory channel to the non-volatile DIMM, in this case an NVDIMM-P including a media controller, a non-volatile medium, and DRAM.

For non-volatile read commands transmitted over the heterogeneous memory channel, the non-volatile DIMM typically responds after a non-deterministic time period due to the unpredictable process of reading the requested data, which may be in non-volatile memory at the non-volatile DIMM, in DRAM at the non-volatile DIMM, or in a cache at the media controller. During the non-deterministic time period, other memory access commands are typically fulfilled and removed from the memory interface queue. When the media controller at the non-volatile DIMM completes the process of reading the requested data, it sends a ready response signal "RD_RDY" to the memory controller. Typically, the RD_RDY signal is sent and received on a separate sub-channel of the heterogeneous memory channel rather than a sub-channel on which the memory interface queue receives responses to the memory access commands. For example, with an NVDIMM-P memory channel, the RD_RDY signal is typically sent on a "RSP_R" line of the memory channel separate from the "CMD" and "DQ" lines on which commands and data are transmitted.

At block 712, the RD_RDY signal is received from the non-volatile DIMM indicating that responsive data is available for an associated one of the non-volatile read commands. A control circuit, which in this example is the NV buffer control circuitry, receives the RD_RDY signal. Arrow 404 in FIG. 5 depicts the RD_RDY signal passing from the non-volatile DIMM to the NV buffer control circuit. In response, at block 714, the control circuit places a SEND command in the memory interface queue, as depicted by arrow 405. The SEND command is thereby scheduled or queued for transmission to the non-volatile DIMM, depicted at arrow 406 in FIG. 6. The SEND command has a deterministic response time because the responsive data is ready to be sent from the non-volatile DIMM when the SEND command arrives, and therefore the SEND command does not add nondeterministic delay to the memory interface queue operation. If the non-volatile read commands were held in the memory interface queue, rather than the NV queue, until the command was fulfilled, it would "clog" the memory interface queue, delaying processing of other commands and adding delay to the overall processing of commands.

Upon receiving the SEND command, the non-volatile DIMM media controller transmits the responsive data that was read for the non-volatile read command, including an associated identifier for the command back to the memory controller. The associated identifier in this embodiment is a read identifier "RID" for the read command, as depicted by arrow 407 in FIG. 6 showing the data and RID transmitted to the memory controller.

At block 716, the responsive data and associated identifier are received from the non-volatile DIMM by the memory controller. In response, the NV buffer of the memory controller uses the associated identifier to identify the non-volatile read command in the NV Queue with the same associated identifier. At block 718, the responsive data is provided in fulfillment of the associated non-volatile read request for which the non-volatile ready command was produced. This fulfills the request, and the associated non-volatile read command is removed from the NV Queue as depicted by arrow 408 and the crossed-out XREAD command in the NV Queue.

In some embodiments, process 700 includes scheduling the memory access commands with an arbiter such as arbiter 238 (FIG. 2). In one example, before placing the memory access commands in the memory interface queue, the process groups non-volatile read commands with other non-volatile read commands or volatile read commands. This grouping is depicted in FIG. 4 where arrow 401 shows memory access commands placed into the memory interface queue in a new order, with READ (a volatile read command) and XREAD (a type of non-volatile read command) commands grouped together, and WRITE (a volatile write command) and WRITE (a type of non-volatile write command) commands grouped together.

In some embodiments, process 700 at block 714 further includes, before placing the SEND command in the memory interface queue, grouping the SEND command with a group of non-volatile or volatile read commands before placing the send command in the memory interface queue. This is depicted at arrow 405 of FIG. 5 where the SEND command is placed in a group of READ commands.

Thus, a memory controller and data processing system as described herein improves the ability of the memory controller to interface with non-volatile DIMMs on a heterogeneous memory channel. Moreover, the memory controller herein reduces the length needed for the memory interface queue by eliminating the need for the memory interface queue to hold non-volatile read commands for long periods of time until they are fulfilled.

Memory controller 200 of FIG. 2 or any portions thereof, such as arbiter 238, may be described or represented by a computer accessible data structure in the form of a database or other data structure which can be read by a program and used, directly or indirectly, to fabricate integrated circuits. For example, this data structure may be a behavioral-level description or register-transfer level (RTL) description of the hardware functionality in a high level design language (HDL) such as Verilog or VHDL. The description may be read by a synthesis tool which may synthesize the description to produce a netlist including a list of gates from a synthesis library. The netlist includes a set of gates that also represent the functionality of the hardware including integrated circuits. The netlist may then be placed and routed to produce a data set describing geometric shapes to be applied to masks. The masks may then be used in various semiconductor fabrication steps to produce the integrated circuits. Alternatively, the database on the computer accessible storage medium may be the netlist (with or without the synthesis library) or the data set, as desired, or Graphic Data System (GDS) II data.

While particular embodiments have been described, various modifications to these embodiments will be apparent to those skilled in the art. For example, the internal architecture of memory channel controller 210 and/or power engine 250 may vary in different embodiments. Memory controller 200 may interface to other types of memory besides NVDIMM-P and DDRx, such as high bandwidth memory (HBM), RAMbus DRAM (RDRAM), and the like. While the illustrated embodiment showed each rank of memory corresponding to separate DIMMs, in other embodiments each DIMM can support multiple ranks. Further, while a heterogeneous memory channel is generally supported, the heterogeneous channel may be filled entirely with non-volatile DIMMs. Furthermore, while the example type of non-volatile read commands discussed herein is XREAD commands, other types of non-volatile read commands are supported. For example, the NVDIMM-P specification provides a speculative read (SREAD) command that has a deterministic response time if the requested memory is found in DRAM on the non-volatile DIMM, but is interpreted as a non-volatile read with a non-deterministic response time if the non-volatile DIMM determines the requested data is not available in DRAM and it instead has to read from the non-volatile memory medium. In some embodiments, if such a "miss" occurs SREAD commands are also be added to the NV queue and then treated similar to XREADs.

Accordingly, it is intended by the appended claims to cover all modifications of the disclosed embodiments that fall within the scope of the disclosed embodiments.

What is claimed is:

1. A memory controller, comprising:
a command queue having a first input for receiving memory access commands including volatile memory reads, volatile memory writes, non-volatile memory reads, and non-volatile memory writes, and an output, and having a plurality of entries;
a memory interface queue having an input coupled to the output of the command queue, and an output for coupling to a heterogeneous memory channel coupled to at least one non-volatile storage class memory (SCM) module including non-volatile memory addressable in a system memory space;
a non-volatile command queue (NV queue) coupled to the output of the command queue for storing non-volatile read commands that are placed in the memory interface queue;
an arbiter coupled to the command queue for selecting entries from the command queue, and placing them in the memory interface queue causing them to be transmitted over the heterogeneous memory channel; and
a control circuit adapted to be coupled to the heterogeneous memory channel for receiving a ready response from the non-volatile SCM module indicating that responsive data is available for an associated one of the non-volatile read commands, and in response to receiving the ready response, causing a send command to be placed in the memory interface queue for commanding the non-volatile SCM module to send the responsive data.

2. The memory controller of claim 1, wherein the control circuit is further adapted to detect that responsive data and an associated identifier are received from the non-volatile SCM module and, in response, identify the associated non-volatile read command in the non-volatile queue using the associated identifier, and remove the associated non-volatile read command from the non-volatile queue.

3. The memory controller of claim 1, wherein the arbiter, before placing the memory access commands in the memory interface queue, groups non-volatile memory read commands with other non-volatile read commands or volatile read commands.

4. The memory controller of claim 3, wherein the arbiter groups the send command with non-volatile read commands or volatile read commands before placing the send command in the memory interface queue.

5. The memory controller of claim 1, wherein:
the memory controller is operable to receive the ready response after a non-deterministic time period following the associated non-volatile read command; and
during the non-deterministic time period, the memory controller is operable to fulfill other memory access commands, and remove them from the memory interface queue.

6. The memory controller of claim 1, wherein the control circuit receives the ready response on a separate sub-channel of the heterogeneous memory channel than a sub-channel on which the memory interface queue receives responses to the memory access commands.

7. A method, comprising:
receiving a plurality of memory access requests including volatile memory reads, volatile memory writes, non-volatile memory reads, and non-volatile memory writes;
placing memory access commands for fulfilling the memory access requests in a memory interface queue and transmitting the memory access commands from the memory interface queue to a heterogeneous memory channel coupled to a non-volatile storage class memory (SCM) module including non-volatile memory addressable in a system memory space;
storing the non-volatile read commands that are placed in the memory interface queue in a non-volatile command queue (NV queue); and
receiving a ready response from the non-volatile SCM module indicating that responsive data is available for an associated one of the non-volatile read commands, and in response to receiving the ready response, placing a send command for commanding the non-volatile SCM module to send the responsive data in the memory interface queue.

8. The method of claim 7, further comprising receiving the responsive data and an associated identifier from the non-volatile SCM module and, in response, identifying the associated non-volatile read command in the NV queue using the associated identifier, providing the responsive data in fulfillment of an associated non-volatile read request, and removing the associated non-volatile read command from the NV queue.

9. The method of claim 7, further comprising, before placing the memory access commands in the memory interface queue, grouping non-volatile read commands with other non-volatile read commands or volatile read commands.

10. The method of claim 9, further comprising, before placing the send command in the memory interface queue, grouping the send command with a group of non-volatile or volatile read commands before placing the send command in the memory interface queue.

11. The method of claim 7, wherein:
the ready response is received after a non-deterministic time period following the associated non-volatile read command; and
during the non-deterministic time period, other memory access commands are fulfilled and removed from the memory interface queue.

12. The method of claim 7, wherein the ready response is received on a separate sub-channel of the heterogeneous memory channel than a sub-channel on which the memory interface queue receives responses to the memory access commands.

13. A data processing system, comprising:
a central processing unit;
a data fabric coupled to the central processing unit; and
a memory controller coupled to the data fabric for fulfilling memory requests from the central processing unit, the memory controller comprising:
a command queue having a first input for receiving memory access commands including volatile read commands, volatile write commands, non-volatile read commands, and non-volatile write commands, and an output, and having a plurality of entries;
a memory interface queue having an input coupled to the output of the command queue, and an output coupled to a heterogeneous memory channel which is coupled to at least one non-volatile storage class memory (SCM) module including non-volatile memory addressable in a system memory space;

a non-volatile command queue (NV queue) coupled to the output of the command queue for storing non-volatile read commands that are placed in the memory interface queue;

an arbiter coupled to the command queue for selecting entries from the command queue, placing them in the memory interface queue causing them to be transmitted over the heterogeneous memory channel; and control logic coupled to the heterogeneous memory channel for receiving a ready response from the non-volatile SCM module indicating that responsive data is available for an associated one of the non-volatile read commands, and in response to receiving the ready response, causing a send command to be placed in the memory interface queue for commanding the non-volatile SCM module to send the responsive data.

14. The data processing system of claim 13, wherein the control logic further detects that responsive data and an associated identifier are received from the non-volatile SCM module and, in response, identifies the associated non-volatile read command in the NV queue using the associated identifier, and removes the associated non-volatile read command from the NV queue.

15. The data processing system of claim 13, wherein the arbiter, before placing the memory access commands in the memory interface queue, groups non-volatile read commands with other non-volatile read commands or volatile read commands.

16. The data processing system of claim 15, wherein the arbiter groups the send command with non-volatile read commands or volatile read commands before placing the send command in the memory interface queue.

17. The data processing system of claim 13, wherein:

the memory controller receives the ready response after a non-deterministic time period following the associated non-volatile read command; and during the non-deterministic time period, the memory controller fulfills other memory access commands, and removes them from the memory interface queue.

18. The data processing system of claim 13, wherein the ready response is received on a separate sub-channel of the heterogeneous memory channel than a sub-channel on which the memory interface queue receives responses to other ones of the memory access commands.

* * * * *